(12) United States Patent
Wang et al.

(10) Patent No.: US 9,874,247 B2
(45) Date of Patent: Jan. 23, 2018

(54) INTERNAL COOLING BEARING PADS

(71) Applicant: Elliott Company, Jeannette, PA (US)

(72) Inventors: Qingyu Wang, Delmont, PA (US); Scot Jason Laney, Irwin, PA (US); Manish Rambhau Thorat, Monroeville, PA (US)

(73) Assignee: Elliott Company, Jeannette, PA (US)

( * ) Notice: Subject to any disclaimer, the term of this patent is extended or adjusted under 35 U.S.C. 154(b) by 0 days.

(21) Appl. No.: 15/149,236

(22) Filed: May 9, 2016

(65) Prior Publication Data

US 2017/0321754 A1    Nov. 9, 2017

(51) Int. Cl.
*F16C 37/00* (2006.01)
*F16C 32/06* (2006.01)

(52) U.S. Cl.
CPC ........ *F16C 37/002* (2013.01); *F16C 32/0655* (2013.01)

(58) Field of Classification Search
CPC ........ F16C 17/03; F16C 17/035; F16C 17/06; F16C 17/065; F16C 37/00; F16C 37/002; F16C 33/1025; F16C 33/1045; F16C 33/105; F16C 33/108; F16C 33/1085
See application file for complete search history.

(56) References Cited

U.S. PATENT DOCUMENTS

| | | | |
|---|---|---|---|
| 1,117,502 A | 11/1914 | Kingsbury | |
| 3,004,804 A * | 10/1961 | Pinkus | F16C 17/03 384/311 |
| 3,339,990 A * | 9/1967 | Wendt | F16C 17/03 384/311 |
| 3,408,122 A * | 10/1968 | Burger | F16C 17/06 384/303 |
| 3,814,487 A | 6/1974 | Gardner | |
| 3,944,304 A * | 3/1976 | Purtschert | F16C 17/03 384/117 |
| 4,322,116 A * | 3/1982 | Heinemann | F16C 13/04 384/100 |
| 4,501,505 A | 2/1985 | Chambers | |
| 4,699,524 A | 10/1987 | Bath | |

(Continued)

FOREIGN PATENT DOCUMENTS

| | | | | |
|---|---|---|---|---|
| JP | 2003113834 A * | 4/2003 | | F16C 17/03 |
| JP | 2014152875 A | 8/2014 | | |
| WO | WO-2015120429 A1 * | 8/2015 | | B29C 67/0055 |

OTHER PUBLICATIONS

Translation of JP-2003113834 dated Apr. 2003.*

(Continued)

*Primary Examiner* — Alan B Waits
(74) *Attorney, Agent, or Firm* — The Webb Law Firm

(57) ABSTRACT

A fluid bearing for use in turbomachinery including at least one bearing pad configured to be arranged about a rotating member of the turbomachinery. Each bearing pad includes an internal cooling opening defined in the bearing pad and an internal channel network defined in the bearing pad with at least one channel node in fluid communication with the internal cooling opening and at least two passageways in fluid communication with and extending from the channel node through the bearing pad. At least one of the passageways extends to an exterior surface of the bearing pad to define at least one cooling discharge opening.

22 Claims, 11 Drawing Sheets

(56) References Cited

U.S. PATENT DOCUMENTS

| | | | |
|---|---|---|---|
| 4,772,188 A | 9/1988 | Kimura et al. | |
| 4,874,302 A | 10/1989 | Kobayashi et al. | |
| 5,007,745 A | 4/1991 | Ball et al. | |
| 5,222,815 A | 6/1993 | Ide | |
| 5,556,208 A | 9/1996 | Ide | |
| 5,558,446 A | 9/1996 | Kallenberger | |
| 5,702,186 A | 12/1997 | Hackstie et al. | |
| 5,707,718 A * | 1/1998 | Matsukawa | F16C 17/026 384/108 |
| 5,772,335 A * | 6/1998 | Miller | F16C 17/03 384/117 |
| 6,089,754 A | 7/2000 | Wilkes et al. | |
| 6,132,094 A | 10/2000 | Cornelison et al. | |
| 6,200,034 B1 * | 3/2001 | Miller | F16C 17/03 384/117 |
| 6,588,933 B2 | 7/2003 | Ferguson | |
| 6,739,756 B2 * | 5/2004 | Miller | F16C 17/03 384/117 |
| 6,746,152 B2 | 6/2004 | Branagan | |
| 8,668,388 B1 | 3/2014 | Peterson | |
| 8,764,377 B2 | 7/2014 | Frankenstein et al. | |
| 8,834,032 B2 * | 9/2014 | Suzuki | F16C 17/03 384/311 |
| 8,845,196 B2 | 9/2014 | Kim | |
| 9,121,448 B2 * | 9/2015 | Delgado Marquez | F01D 25/166 |
| 9,556,900 B2 * | 1/2017 | Dayot | F16C 23/043 |
| 9,611,886 B2 * | 4/2017 | Sato | F16C 33/108 |
| 2003/0142890 A1 * | 7/2003 | Miller | F16C 17/03 384/117 |
| 2004/0105601 A1 | 6/2004 | Honda et al. | |
| 2005/0047690 A1 | 3/2005 | Keramati et al. | |
| 2011/0069915 A1 | 3/2011 | Palomba et al. | |
| 2013/0004109 A1 | 1/2013 | Metzger et al. | |
| 2013/0077907 A1 | 3/2013 | Duffy | |
| 2013/0336605 A1 | 12/2013 | Buguin et al. | |
| 2015/0104123 A1 | 4/2015 | Ertas et al. | |
| 2015/0159692 A1 * | 6/2015 | Dourlens | F16C 17/03 384/192 |
| 2016/0169275 A1 * | 6/2016 | Sato | F16C 33/108 384/117 |
| 2016/0169281 A1 * | 6/2016 | Ertas | F16C 32/0662 384/119 |
| 2016/0238065 A1 * | 8/2016 | Otten | B41F 13/10 |
| 2016/0346997 A1 * | 12/2016 | Lewis | B29C 67/0055 |
| 2016/0377116 A1 * | 12/2016 | Buettner | F16C 33/04 384/280 |

OTHER PUBLICATIONS

Wadley, "Multifunctional periodic cellular metals", Philosophical Transactions of the royal Society A, (2006), 364: 31-68.

* cited by examiner

INTERNAL COOLING BEARING PADS

BACKGROUND OF THE INVENTION

Field of the Invention

The present invention relates to fluid bearings having bearing pads, and more particularly, to bearing pads configured to facilitate cooling of the bearing pad.

Description of Related Art

Certain bearings provide an interface between a rotating structure and a contact surface. Hydrodynamic bearings are such that the rotating element (such as a shaft) rides on an oil film between the shaft and the bearing. Shearing of the oil causes the heat to build. The top surface of the bearing facilitates the formation of the oil film or wedge. During operation there should be no physical contact between the two. Journal bearings provide lift to essentially counter external forces including but not limited to gravity, aerodynamic forces such as unbalanced steam forces (in the case of steam turbines), and gear loads for bearings supporting gears and allow the shaft to rotate. Thrust bearings are bearings that deal with axial thrust.

One problem encountered with bearings is the build-up of temperature of the bearing components, including the bearing pads. Temperature of the bearing pads can rise to harmful levels under high speed or load conditions. The temperature may not rise to the same temperature across the entire bearing pad, and in many bearing pads, it has been determined that the trailing edge side of the pivot rises to particularly high temperatures.

Oil can be provided to the bearing, to assist in cooling the bearing pad and the other components of the bearing. Many prior art bearing pads are made of solid metal, which, as previously described, get hot under high speed and load conditions. While the oil can directly contact the surface of these solid bearing pads to aid in cooling the bearing pad, none of the metal beneath the surface is able to be in direct contact with the cooling oil.

Several U.S. patents, including U.S. Pat. Nos. 3,814,487; 5,222,815; 5,556,208; 6,588,933; and 6,746,152, have a duct or passage which allows oil to flow internally through a bearing pad. However, these prior art bearing pads can be mechanically weakened by the ducts or passages that run internally through the bearing pads. Additionally, these prior art bearing pads do not provide the flexibility to optimize the flow pattern of the oil through the bearing pad to more efficiently cool the bearing pad, but, instead, treat the whole bearing pad evenly.

SUMMARY OF THE INVENTION

According to one embodiment, a fluid bearing for use in turbomachinery includes at least one bearing pad configured to be arranged about a rotating member of the turbomachinery. Each bearing pad includes an internal cooling opening defined in the bearing pad and an internal channel network defined in the bearing pad with at least one channel node in fluid communication with the internal cooling opening and at least two passageways in fluid communication with and extending from the channel node through the bearing pad. At least one of the passageways extends to an exterior surface of the bearing pad to define at least one cooling discharge opening. The bearing pad can be defined by an inner radial side and an outer radial side, a first axial side and a second axial side, and a circumferential leading edge and a circumferential trailing edge. The bearing pad can be arcuate-shaped. The internal cooling opening can be defined in the outer radial side of the bearing pad proximate the trailing edge of the bearing pad. The internal cooling opening can be defined in the outer radial side of the bearing pad proximate the leading edge of the bearing pad. The internal cooling opening can be defined in a jacking oil port defined in the outer radial side of the bearing pad. At least one cooling discharge opening can be defined in the first axial side or the second axial side. At least one cooling discharge opening can be defined in the leading edge or the trailing edge. The bearing can include a deck plate and a central support column connected to an outer radial side of the deck plate. The central support column can define a spherical seat. The internal cooling opening can be defined in the spherical seat of the central support column. The central support column can define the internal channel network. A plurality of primary support structures can connect the central support column with the deck plate. Channel support structures can be located within the internal channel network. The channel support structures can be bars or trusses. The channel support structures can mechanically strengthen the bearing pad. At least a portion of the bearing pad can be 3D printed. The portion of the bearing pad that is 3D printed can be proximate a trailing edge of the bearing pad. The portion of the bearing pad that is 3D printed can be proximate a leading edge of the bearing pad. The entire bearing pad can be 3D printed. The portion of the bearing pad that is 3D printed can be printed in a cubic pattern, a corrugated pattern, or a pyramidal pattern. The portion of the bearing pad that is 3D printed can be printed in a hexagonal structure pattern, a square structure pattern, a triangular structure pattern, a diamond structure pattern, a navtruss structure pattern, a tetrahedral structure pattern, a diamond textile structure pattern, a diamond collinear structure pattern, a square collinear structure pattern, a three-dimensional kagome structure pattern, a square honeycomb structure pattern, a triangular honeycomb structure pattern, or a corrugated honeycomb structure pattern. The bearing can further include a plurality of secondary support structures, each secondary support structure connecting the primary support structure to the deck plate, another of the secondary support structures, or the central support column. The primary support structures or the secondary support structures can be hollow. The primary support structures or the secondary support structures can be in fluid communication with the internal channel network defined in the central support column such that cooling oil can flow through the primary support structures or the secondary support structures.

In another embodiment, a bearing pad includes an internal cooling opening defined in the bearing pad and an internal channel network defined in the bearing pad with at least one channel node in fluid communication with the internal cooling opening and at least two passageways in fluid communication with and extending from the channel node through the bearing pad. At least one of the passageways extends to an exterior surface of the bearing pad to define at least one cooling discharge opening. The bearing pad can be defined by an inner radial side and an outer radial side, a first axial side and a second axial side, and a circumferential leading edge and a circumferential trailing edge.

Further embodiments and aspects will now be described in the following numbered clauses:

Clause 1: A fluid bearing for use in turbomachinery comprising: at least one bearing pad configured to be arranged about a rotating member of the turbomachinery, each bearing pad comprising: an internal cooling opening defined in the bearing pad; and an internal channel network defined in the bearing pad comprising at least one channel node in fluid communication with the internal cooling opening and at least two passageways in fluid communication with and extending from the channel node through the bearing pad, wherein at least one of the passageways extends to an exterior surface of the bearing pad to define at least one cooling discharge opening.

Clause 2: The fluid bearing of clause 1, wherein the bearing pad is defined by an inner radial side and an outer radial side, a first axial side and a second axial side, and a circumferential leading edge and a circumferential trailing edge.

Clause 3: The fluid bearing of clause 2, wherein the internal cooling opening is defined in the outer radial side of the bearing pad proximate the trailing edge of the bearing pad.

Clause 4: The fluid bearing of clause 2, wherein the internal cooling opening is defined in the outer radial side of the bearing pad proximate the leading edge of the bearing pad.

Clause 5: The fluid bearing of clause 2, wherein the internal cooling opening is defined in a jacking oil port defined in the outer radial side of the bearing pad.

Clause 6: The fluid bearing of any of clauses 2-5, wherein at least one cooling discharge opening is defined in the first axial side or the second axial side.

Clause 7: The fluid bearing of any of clauses 2-6, wherein at least one cooling discharge opening is defined in the leading edge or the trailing edge.

Clause 8: The fluid bearing of clause 1, further comprising: a deck plate; a central support column connected to an outer radial side of the deck plate, wherein the central support column defines a spherical seat, wherein the internal cooling opening is defined in the spherical seat of the central support column, wherein the central support column defines the internal channel network; and a plurality of primary support structures connecting the central support column with the deck plate.

Clause 9: The fluid bearing of clauses 1-8, wherein channel support structures are located within the internal channel network.

Clause 10: The fluid bearing of clause 9, wherein the channel support structures are bars or trusses.

Clause 11: The fluid bearing of any of clauses 9-10, wherein the channel support structures mechanically strengthen the bearing pad.

Clause 12: The fluid bearing of any of clauses 1-11, wherein at least a portion of the bearing pad is 3D printed.

Clause 13: The fluid bearing of clause 12, wherein the portion of the bearing pad that is 3D printed is proximate a trailing edge of the bearing pad.

Clause 14: The fluid bearing of clause 12, wherein the portion of the bearing pad that is 3D printed is proximate a leading edge of the bearing pad.

Clause 15: The fluid bearing of any of clauses 1-14, wherein the entire bearing pad is 3D printed.

Clause 16: The fluid bearing of any of clauses 12-14, wherein the portion of the bearing pad that is 3D printed is printed in a cubic pattern, a corrugated pattern, or a pyramidal pattern.

Clause 17: The fluid bearing of clause 8, further comprising a plurality of secondary support structures, each secondary support structure connecting the primary support structure to the deck plate, another of the secondary support structures, or the central support column.

Clause 18: The fluid bearing of clause 17, wherein the primary support structures or the secondary support structures are hollow, and wherein the primary support structures or the secondary support structures are in fluid communication with the internal channel network defined in the central support column such that cooling oil can flow through the primary support structures or the secondary support structures.

Clause 19: A bearing pad comprising: an internal cooling opening defined in the bearing pad; and an internal channel network defined in the bearing pad comprising at least one channel node in fluid communication with the internal cooling opening and at least two passageways in fluid communication with and extending from the channel node through the bearing pad, wherein at least one of the passageways extends to an exterior surface of the bearing pad to define at least one cooling discharge opening.

Clause 20: The bearing pad of clause 19, wherein the bearing pad is defined by an inner radial side and an outer radial side, a first axial side and a second axial side, and a circumferential leading edge and a circumferential trailing edge.

Clause 21: The fluid bearing of clause 2, wherein the bearing pad is arcuate-shaped.

Clause 22: The fluid bearing according to any of clauses 12-14, wherein the portion of the bearing pad that is 3D printed is printed in a hexagonal structure pattern, a square structure pattern, a triangular structure pattern, a diamond structure pattern, a navtruss structure pattern, a tetrahedral structure pattern, a diamond textile structure pattern, a diamond collinear structure pattern, a square collinear structure pattern, a three-dimensional kagome structure pattern, a square honeycomb structure pattern, a triangular honeycomb structure pattern, or a corrugated honeycomb structure pattern.

These and other features and characteristics of internal cooling bearing pads, as well as the methods of manufacture and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
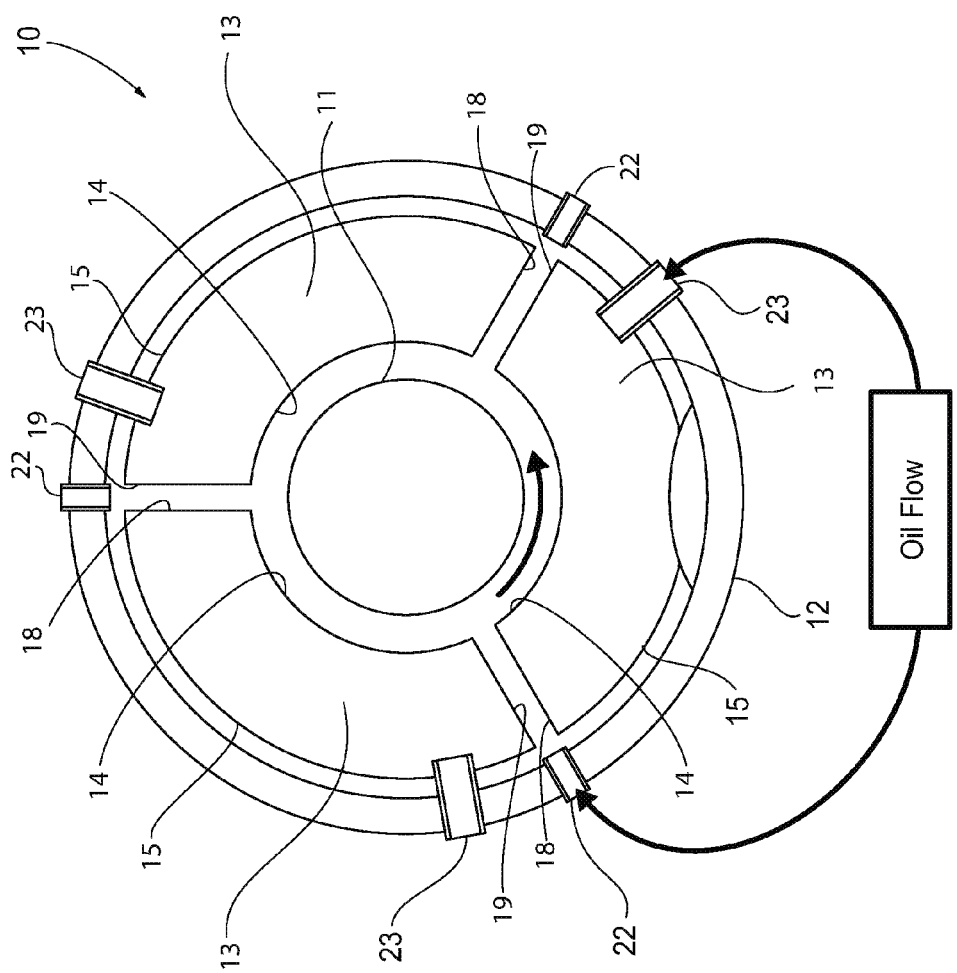
FIG. 1 shows a front view of a fluid bearing including at least one bearing pad according to one embodiment of the invention.

For purposes of the description hereinafter, the terms "upper", "lower", "right", "left", "vertical", "horizontal", "top", "bottom", "lateral", "longitudinal", "axial", "radial", "circumferential", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIG. 1, a fluid bearing 10 is configured for use in turbomachinery that includes a shaft 11 (or other such rotating member), and the bearing 10 includes a base ring 12 and at least one bearing pad 13. The bearing 10 can be, for instance, a hydrodynamic bearing, a journal bearing, thrust bearing, or other type of bearing. The direction of rotation of the shaft 11 is counterclockwise in FIG. 1, as shown. The bearing pads 13 are configured to be arranged about the shaft 11 of the turbomachinery. The bearing 10 and its components can be made of metal or any other suitable materials. For instance, the bearing pad 13 can include a backing and a bearing surface. The backing can made from metal, such as steel or copper alloys. The bearing surface can be a thin layer of Babbitt metal or polymer.

Referring to FIG. 1 and FIGS. 2A-2C, in one, non-limiting embodiment, the bearing pad 13 can be arcuate-shaped (e.g., like in certain journal bearings). The direction of rotation of the turbomachinery is clockwise in FIGS. 2A-2C, as shown. The arcuate-shaped bearing pad 13 is defined by an exterior surface comprising an inner radial side 14 and an outer radial side 15 (the outer radial side 15 is the radial side more remote from the rotating member of the turbomachinery). The exterior surface of the arcuate-shaped bearing pad 13 can include a circumferential leading edge 18 and a circumferential trailing edge 19. Finally, the exterior surface of the arcuate-shaped bearing pad 13 can include a first axial side 20 and a second axial side 21. In another embodiment (not shown in FIGS. 1 and 2A-2C), the bearing pad 13 is not arcuate-shaped, but can instead be planar (flat-shaped) (e.g., like in certain thrust bearings). Like the previously-described arcuate-shaped bearing pad 13, the flat shaped bearing pad 13 can be defined by an exterior surface comprising an inner radial side 14 and an outer radial side 15. The exterior surface of the flat-shaped bearing pad 13 can also include a circumferential leading edge 18 and a circumferential trailing edge 19. Finally, the exterior surface of the flat-shaped bearing pad 13 can include a first axial side 20 and a second axial side 21. However, unlike the arcuate-shaped bearing pad 13, the flat-shaped bearing pad is not curved into an arc but planar (flat).

Referring back to FIG. 1, the base ring 12 of the bearing 10 is adjacent the outer radial side 15 of the bearing pad 13. The base ring 12 can be configured as a ring in some embodiments. The base ring 12 defines at least one oil feed opening 22, which is a round hole in some embodiments, but the oil feed opening 22 can take any shape sufficient to optimally allow oil to flow therethrough. In some embodiments, as shown in FIG. 1, there can be one oil feed opening 22 corresponding to each bearing pad 13 of the bearing 10. An internal cooling inlet 23 can be inserted into an internal cooling opening 23A (not shown) defined in the outer radial side 15 of the bearing pad 13. The internal cooling inlet 23 can be defined through the base ring 12. As shown in FIG. 1, there can be an internal cooling inlet 23 for each bearing pad 13 of the bearing 10. Thus for each bearing pad 13, there can be an oil feed opening 22 that goes between bearing pads 13 and an internal cooling inlet 23 going into the bearing pad 13. In one embodiment, the internal cooling inlet 23 can be inserted into the internal cooling opening 23A defined in the outer radial side 15 of the bearing pad 13 proximate the trailing edge 19 (i.e., closer to the trailing edge 19 than the leading edge 18). In one embodiment, the internal cooling inlet 23 can be inserted into the internal cooling opening 23A defined in the outer radial side 15 of the bearing pad 13 proximate the leading edge 18 (i.e., closer to the leading edge 18 than the trailing edge 19). In one embodiment, the internal cooling inlet 23 can be inserted into the internal cooling opening 23A defined in a jacking oil port 30 (shown in FIG. 2A) defined in the outer radial side 15 of the bearing pad 13. More than one internal cooling inlet 23 may be provided in some embodiments. The internal cooling inlet 23 can be a cylindrical inlet, but the internal cooling inlet 23 can take any shape sufficient to allow oil to flow therethrough and sufficient to be inserted into the internal cooling opening 23A. Oil provided to the bearing 10 can be used to help cool the bearing pads 13, which heat up during use in the turbomachinery. Oil can flow through the bearing 10, for instance, based on the flow pattern shown in FIG. 1. The oil flows through the oil feed openings 22 and the internal cooling inlet 23 to cool the bearing pad 13. The oil that flows through the internal cooling inlet 23 can help to internally cool the bearing pad 13. The oil that flows through the oil feed openings 22 can help to externally cool the bearing pad 13 and to lubricate the bearing pad 13. The diameters or areas through which the oil flows through the oil feed openings 22 and the internal cooling inlet 23 can be selected to optimize the flow of oil to the bearing 10, to achieve the best cooling effect. In some embodiments, the diameter or area through which the oil flows through each oil feed opening 22 is smaller than the diameter or are through which the oil flows through each internal cooling opening 23A.

Referring again to FIGS. 2A-2C, the bearing pad 13 defines an internal channel network 26. The internal channel network 26 is a network of hollow tunnels through the bearing pad 13. The internal channel network 26 is made up of at least one channel node 25 and at least two passageways 27. The channel node 25 of the internal channel network 26 is in fluid communication with an internal cooling opening 23A (which can receive the internal cooling inlet 23 (not shown)) and configured to allow oil to flow therethrough. In some embodiments, the diameter of the internal cooling opening 23A can be larger than the internal cooling inlet 23 with a proper tolerance (so that the internal cooling opening 23A can receive the internal cooling inlet 23). The internal cooling opening 23A can be defined in the outer radial side 15 of the bearing pad 13. In certain non-limiting embodiments, the internal cooling opening 23A can be defined proximate the leading edge 18, proximate the trailing edge 19, or in the jacking oil port 30. The passageways 27 of the internal channel network 26 are in fluid communication with the channel node 25. The passageways 27 extend from the channel node 25 through the bearing pad 13, and the passageways 27 are configured to allow oil to flow therethrough. At least one of the passageways 27 extends to an exterior surface of the bearing pad 13 (e.g., the inner radial side 14, the outer radial side 15, the leading edge 18, the trailing edge 19, the first axial side 20, or the second axial side 21). The passageways 27 that run to the exterior surface of the bearing pad 13 define at least one cooling discharge opening 28. However, not every passageway 27 will necessarily flow to the exterior surface of the bearing pad 13, and certain passageways 27 may terminate before reaching the exterior surface of the bearing pad 13. The design of the bearing pad 13 can be such that the direction of certain passageways 27 pass through or in the vicinity of known "hotspots" of the bearing pad 13.

Figure 2B:
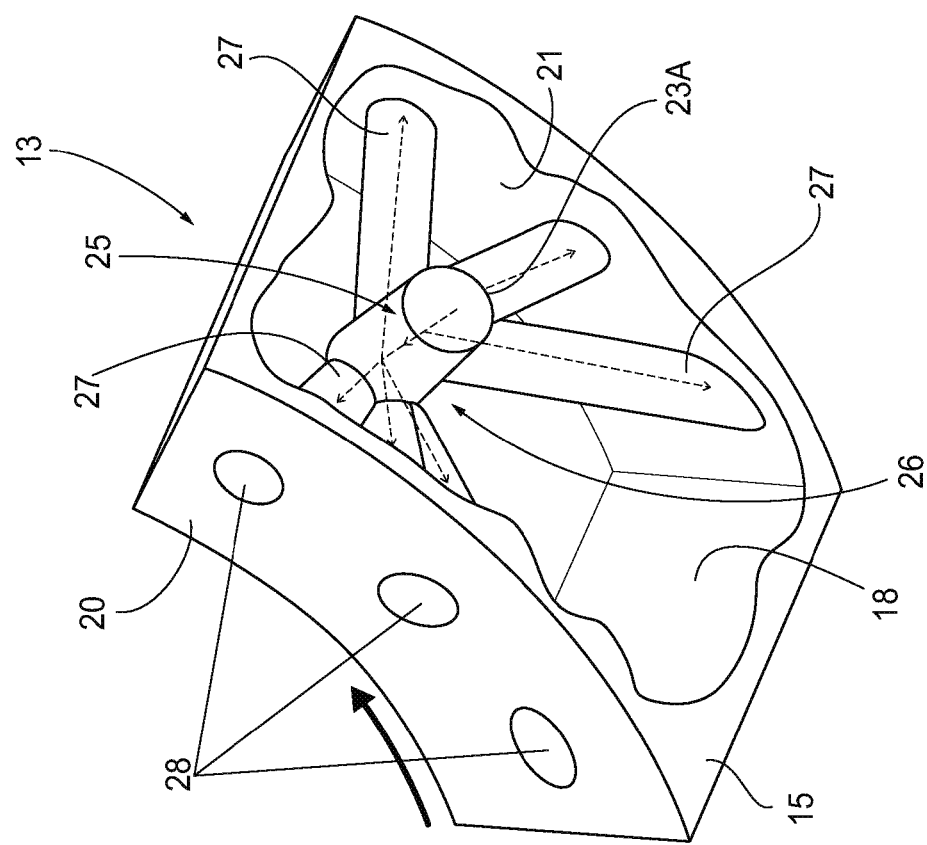
FIG. 2B shows a perspective view of a bearing pad with a portion of an outer radial side cut away to show an internal channel network.

For instance, in FIG. 2B, an embodiment of the bearing pad 13 having an internal channel network 26 with a cooling node 25 and six passageways 27 extending to the first axial side 20 and the second axial side 21 of the bearing pad 13 is shown. The passageways 27 run to the axial exterior surfaces of the bearing pad 13 to define at least one cooling discharge opening 28. The bearing pad shown in FIG. 2B has three discharge openings 28 on the first axial side 20 of the bearing pad 13 and three cooling discharge openings 28 (not shown) on the opposite second axial side 21 of the bearing pad 13. In some embodiments, the cooling discharge openings 28 can be smaller than the internal cooling opening 23A, but it is contemplated that the cooling discharge openings 28 can be the same size or larger than the internal cooling opening 23A.

Figure 2A:
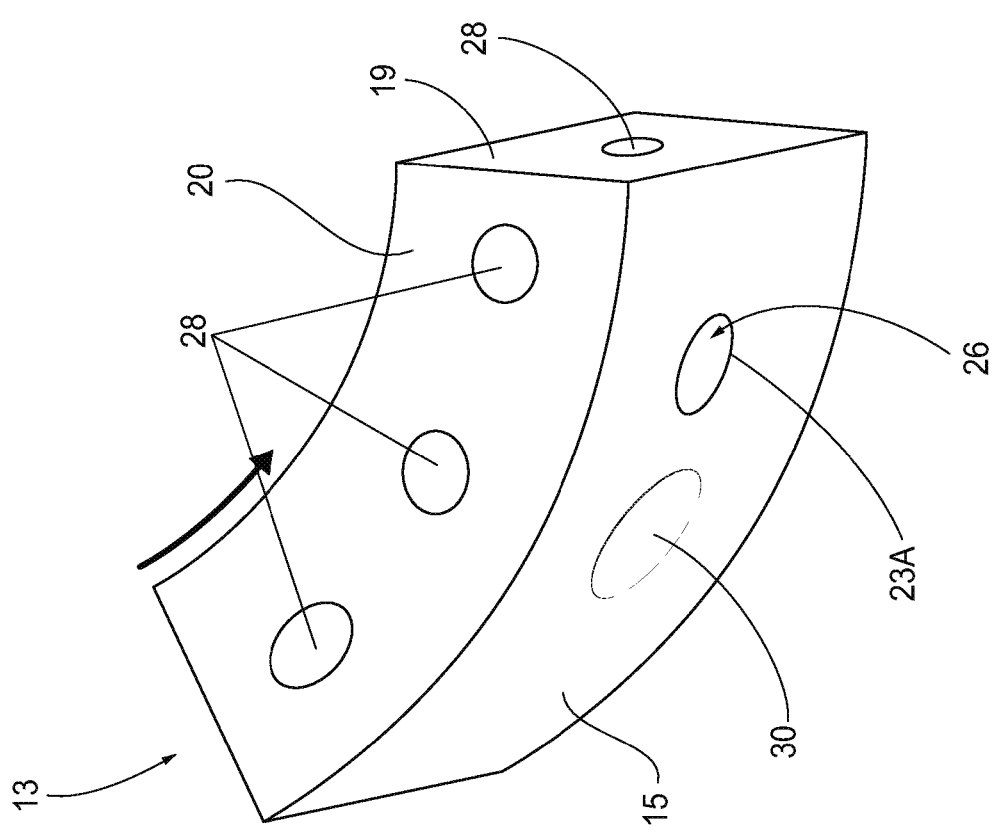
FIG. 2A shows a perspective view of a bearing pad according to one embodiment of the invention.
Figure 2C:
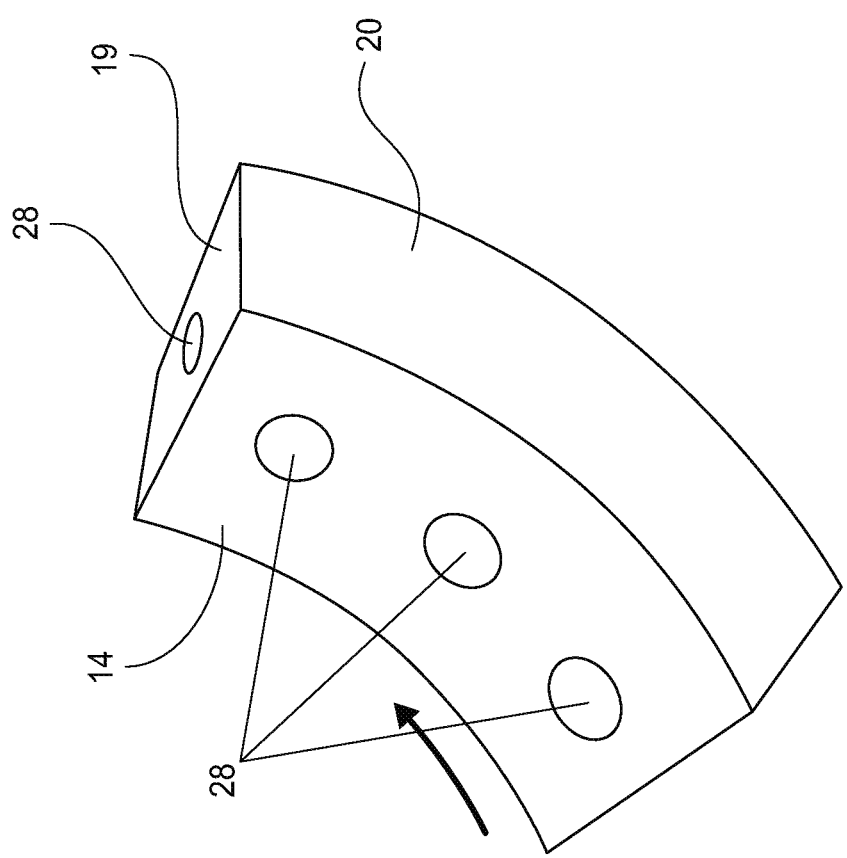
FIG. 2C shows a perspective view of a bearing pad according to one embodiment of the invention.

The cooling discharge openings 28 can be defined axially in the bearing pad 13, in the first axial side 20 or the second axial side 21 of the bearing pad 13 (see, e.g., FIG. 2A-2B). The cooling discharge openings 28 can be defined circumferentially in the bearing pad 13, in the leading edge 18 or the trailing edge 19 of the bearing pad (see, e.g., FIG. 2A). The cooling discharge openings 28 can be defined radially in the inner radial side 14 of the bearing pad 13 (see, e.g., FIG. 2C). The bearing pad 13 may include any combination of axial, circumferential, or radial cooling discharge openings 28.

Oil can flow into the bearing pad 13 through the internal cooling opening 23A and to the internal channel network 26, for instance, according to the flow pattern indicated by the dotted lines in FIG. 2B. Specifically, the oil can enter the bearing pad 13 through the internal cooling opening 23A and into the channel node 25 of the internal channel network 26. The oil can then flow from the channel node 25 to one of the passageways 27 to further internally cool the bearing pad 13. The oil can then exit the bearing pad 13 through one of the cooling discharge openings 28 at the axial, circumferential, or radial exterior surfaces of the bearing pad 13. The internal channel network 26 can be optimized to reach "hotspots" within the bearing pad 13 and to more efficiently cool the bearing pad 13 (i.e., the plurality of passageways 27 can be configured so as to flow oil in the vicinity of known hotspots). The location, size, and discharge area of the cooling discharge openings 28 can also be optimized. In some embodiments, such as the one shown in FIG. 2B, the bearing pad 13 outside of the internal channel network 26 is hollow; however, in other embodiments, the bearing pad 13 will be solid except for the internal cooling opening 23A, the internal channel network 26 (including the channel node 25 and the passageways 27), and the cooling discharge openings 28 defined in the bearing pad 13. The bearing pad 13 can also define a jacking oil port 30 in the outer radial side 15 of bearing pad 13, as shown in FIG. 2A. The bearing pad 13, such as the bearing pad 13 shown in FIGS. 2A-2C, can be made, at least in part, by 3D printing.

Figure 3:
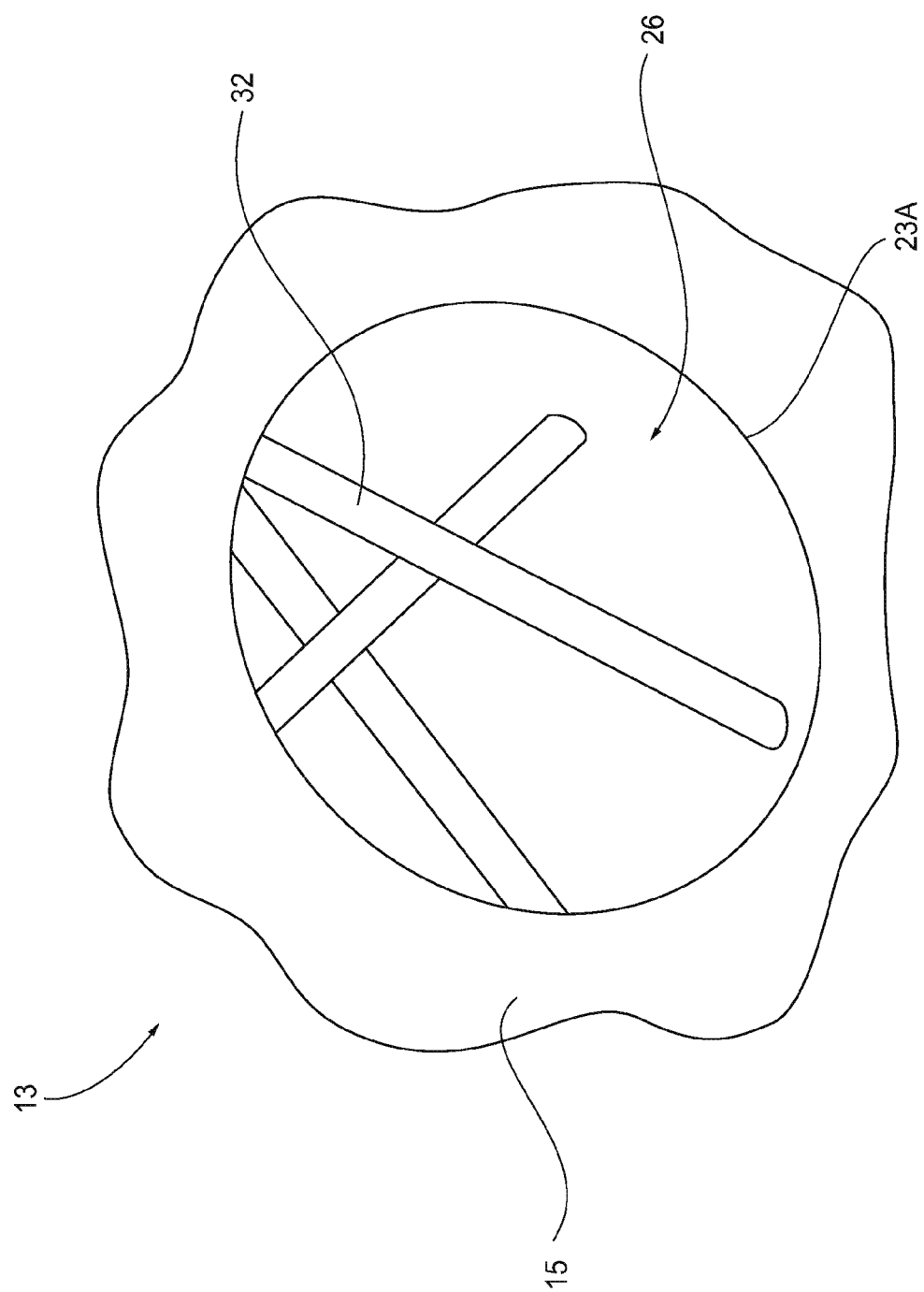
FIG. 3 shows a perspective view of an internal channel network including channel support structures.

FIG. 3 shows a channel support structure 32 located within the internal channel network 26 of the bearing pad 13. The internal channel network 26 can include a plurality of channel support structures 32. In some embodiments, the channel support structures 32 are configured as bars, trusses, or other structures. The channel support structures 32 provide mechanical strength to the bearing pad 13. In some cases, the bearing pad 13 can even be further strengthened by the channel support structures 32, as compared to bearing pad 13 without the internal channel network 26 and channel support structures 32. Additionally, the channel support structures 32 are configured so as to only minimally block the flow of oil through the internal channel network 26. The location of channel support structures 32 in the internal channel network 26 can be optimized to more efficiently cool and strengthen the bearing pad 13.

Figure 4:
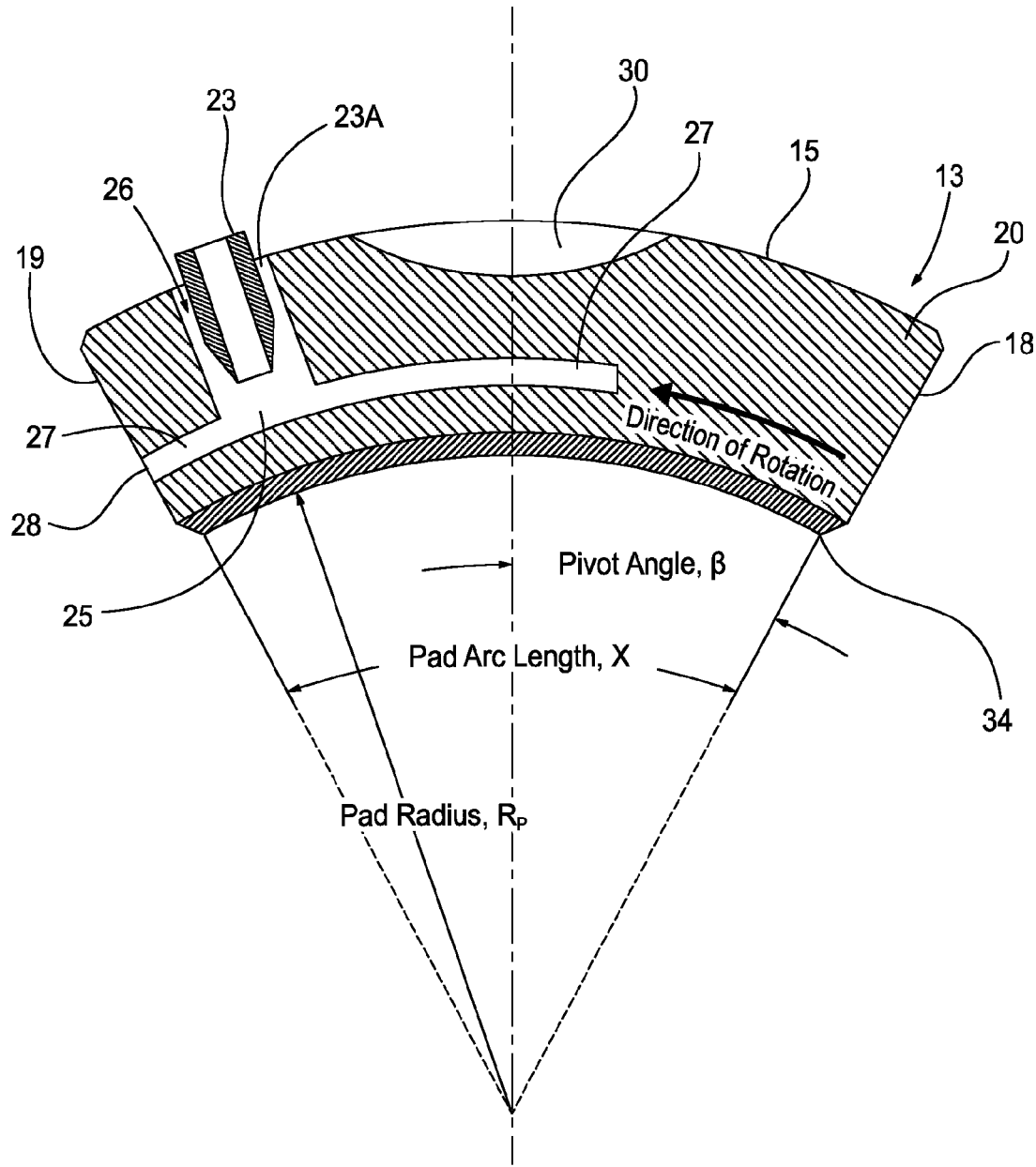
FIG. 4 shows a cross-sectional view of a bearing pad according to one embodiment of the invention.
Figure 5:
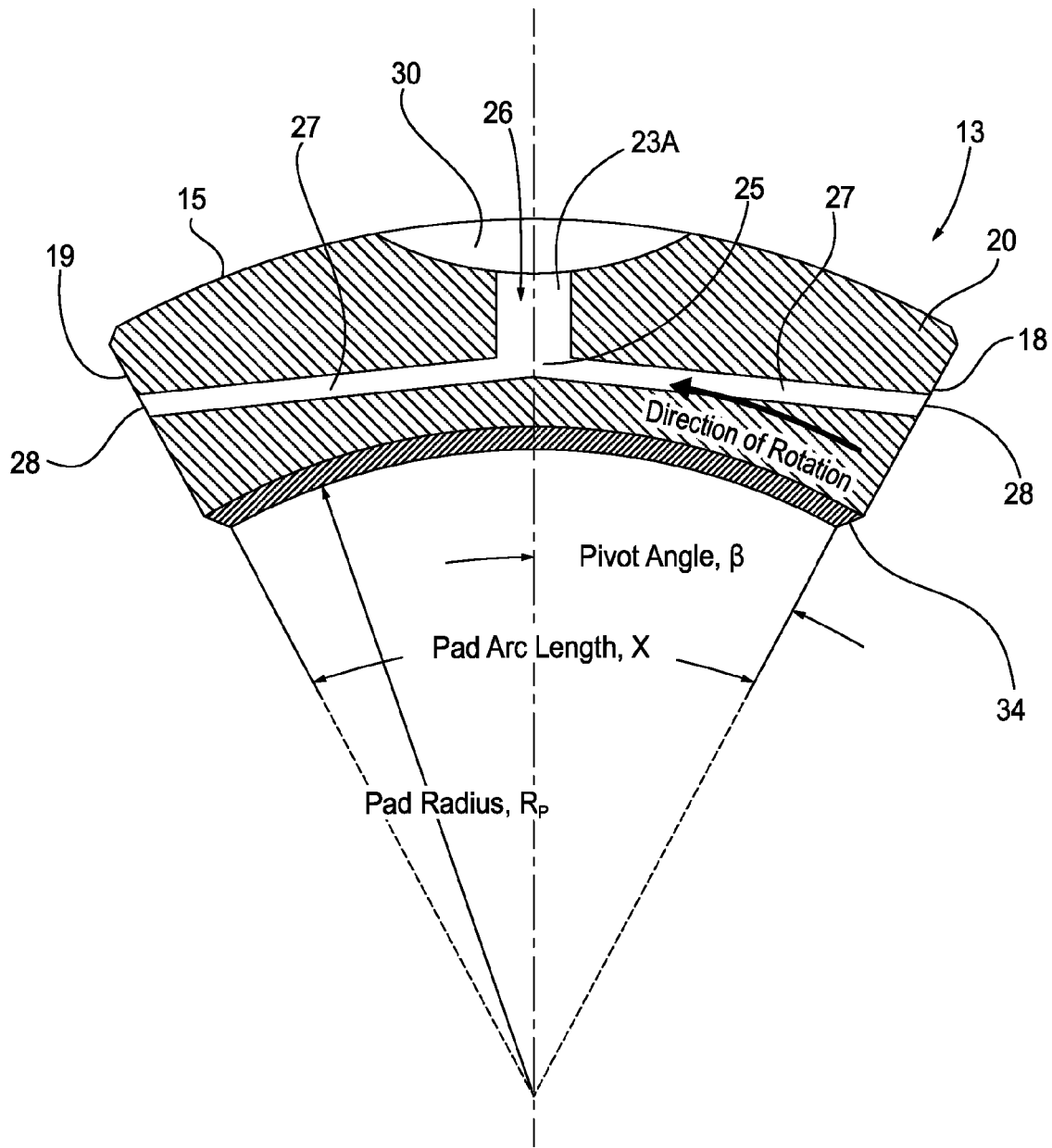
FIG. 5 shows a cross-sectional view of a bearing pad according to another embodiment of the invention.
Figure 6:
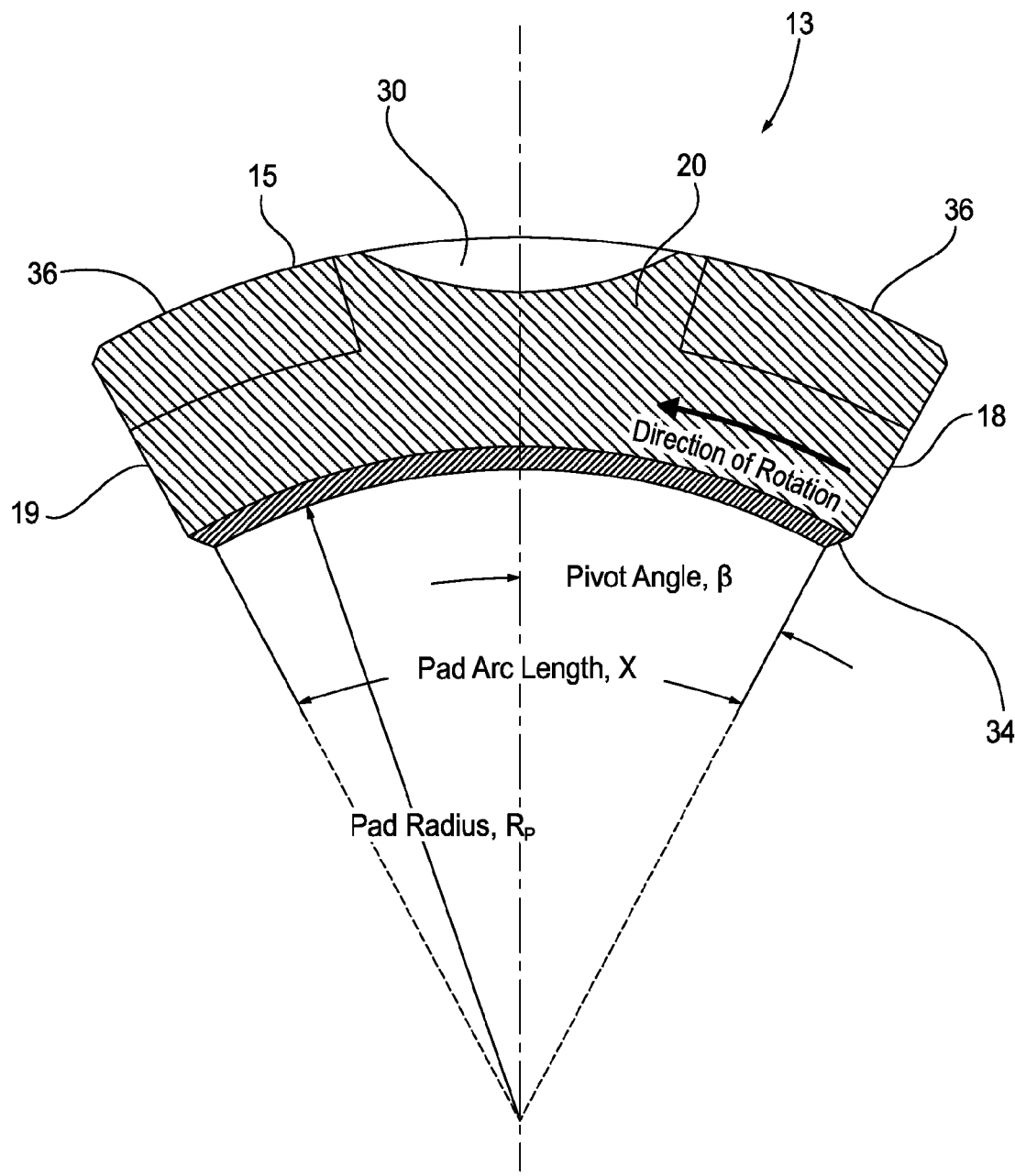
FIG. 6 shows a cross-sectional view of a bearing pad with a 3D printed portion according to one embodiment of the invention.

Referring to FIGS. 4-6, several illustrative embodiments of the bearing pad 13 are shown in detail. FIGS. 4-6 show a pad radius $R_p$, a pad arc length X, and a pivot angle $\beta$ of a bearing. This results in an Offset $\alpha$ of: $\alpha=\beta/X$. Each of the bearing pads 13 also includes a Babbitt thickness 34. Generally, the pad radius $R_p$, pad arc length X, pivot angle $\beta$, and Babbitt thickness can be selected based on adequate rotor dynamic performance of the rotor bearing system in addition to thermal performance. The direction of rotation of the turbomachinery for FIGS. 4-6 is counterclockwise, as shown.

FIG. 4 includes a bearing pad 13 defining an internal cooling opening 23A to receive an internal cooling inlet 23 in fluid communication with an internal channel network 26. The internal channel network 26 has a channel node 25 and at least two passageways 27. In FIG. 4, the internal cooling opening 23A is located proximate the trailing edge 19 (i.e., closer to the trailing edge 19 than the leading edge 18). This allows the high temperature spot typically located on the trailing edge 19 side of the pivot to be more effectively cooled by the oil. The embodiment shown in FIG. 4 also includes at least one cooling discharge opening 28 in fluid communication with at least one passageway 27, the cooling discharge opening 28 located circumferentially about the bearing pad 13, on the trailing edge 19 in this case. Multiple circumferentially located cooling discharge openings 28 can be provided and can be located on the leading edge 18 and/or the trailing edge 19. Circumferentially located cooling discharge openings 28 can be in lieu of or in addition to the earlier-described axially located and radially located cooling discharge openings 28. Besides assisting in cooling the bearing pad 13 near the trailing edge 19, having circumferentially located cooling discharge openings 28 can also assist in enhanced mixing of the hotter oil coming from the trailing edge 19 of the bearing pad 13 with relatively cooler oil from the cooling discharge openings 28, as well as cool oil from the oil feed openings 22 (not shown) between the bearing pads 13 and reduce hot oil carryover to the next bearing pad 13. FIG. 4 only shows one circumferentially placed cooling discharge opening 28, but multiple cooling discharge openings 28 can be provided, including defining one or more cooling discharge openings 28 circumferentially along the leading edge 18 or the trailing edge 19. Additionally, the internal cooling opening 23A can, instead, be closer to the trailing edge 19 or the leading edge 18, compared to the position of the internal cooling opening 23A shown in FIG. 4. Further, the bearing pad 13 can include more than one internal cooling opening 23A and internal cooling inlet 23. FIG. 4 also shows an embodiment having a plurality of passageways 27. At least one of the passageways 27 extends to the trailing edge 19 of the bearing pad 13 to define the cooling discharge opening 28. However, another passageway 27 is provided that does not extend to the exterior surface of the bearing pad 13.

Referring to FIG. 5, in one embodiment, the internal cooling opening 23A can be located in the jacking oil port 30 defined in the outer radial side 15. In this illustrated embodiment, the internal channel network 26 (including the channel node 25 and the passageways 27) can extend to both the leading edge 18 and the trailing edge 19 to define circumferentially placed cooling discharge openings 28. As previously explained, one or more cooling discharge openings 28 can be provided at the leading and/or trailing edge 18, 19, and these circumferentially placed cooling discharge openings 28 can be in addition to or in lieu of the axially located or radially located cooling discharge openings 28 of FIGS. 2A-2C. In one embodiment, the internal channel network 26 does not cut through the Babbitt thickness 34, but, instead, branches off before the Babbitt thickness 34.

With respect to FIGS. 4-5, it is contemplated that the internal cooling channel network 26 in these embodiments can include the previously described channel support structures 32 (not shown).

FIG. 6 shows a bearing pad 13 including printed portions 36 (portions made using 3D printing) of the bearing pad 13. The area(s) of the bearing pad 13 that are printed portions 36 can be selected to more efficiently cool the bearing pad 13. For instance, in one embodiment, a portion near the trailing edge 19 (as shown in FIG. 6) is a printed portion 36 to better provide cooling to the earlier described high temperature spot typically located proximate the trailing edge 19. In another embodiment (also shown in FIG. 6), a printed portion 36 is located proximate the trailing edge 19 and another printed portion 36 is located proximate the leading edge 18. The printed portion 36 allows for a more complex shape to be produced and used as part of the bearing pad 13. The more complex shape can have an enhanced convective surface area, which facilitates and enhances cooling of the bearing pad 13. Additionally, 3D printing also allows for manufacturing of a higher strength bearing pad 13. In one embodiment, at least a portion of the bearing pad 13 is 3D printed where the backing of the bearing pad 13 is entirely 3D printed, and the bearing surface of the bearing pad 13 is 3D printed in a separate process.

The embodiment in FIG. 6 does not show the internal cooling opening 23A, the internal channel network 26 (including the channel node 25 passageways 27), or the cooling discharge openings 28 (like in FIGS. 4-5), but the features from the embodiments in FIGS. 4-5 can be included in the embodiment of FIG. 6 to further enhance cooling of the bearing pad 13. The features of FIG. 6 can also be included in the embodiments in FIGS. 4-5 to further enhance the cooling of the bearing pads 13.

Figure 7A:
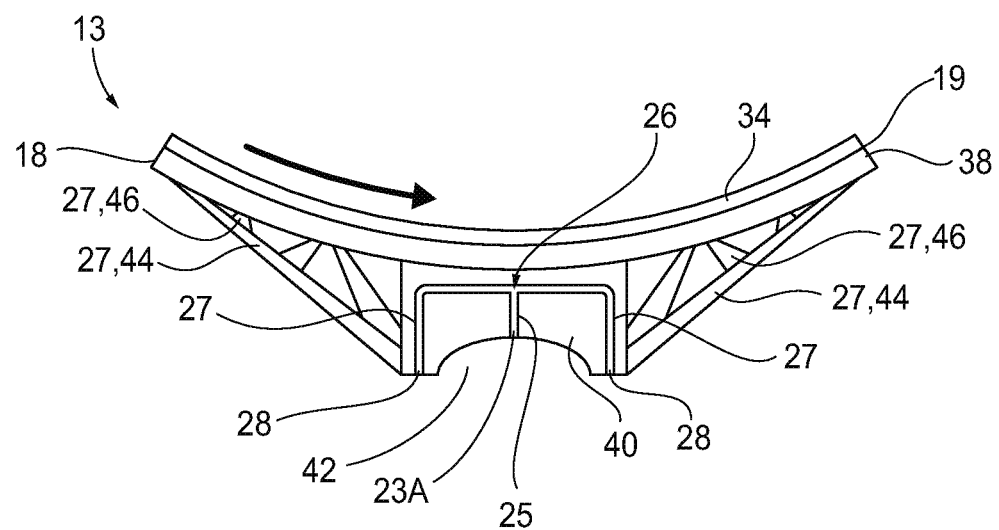
FIG. 7A shows a cross-sectional view of a bearing pad according to another embodiment of the invention.
Figure 7B:
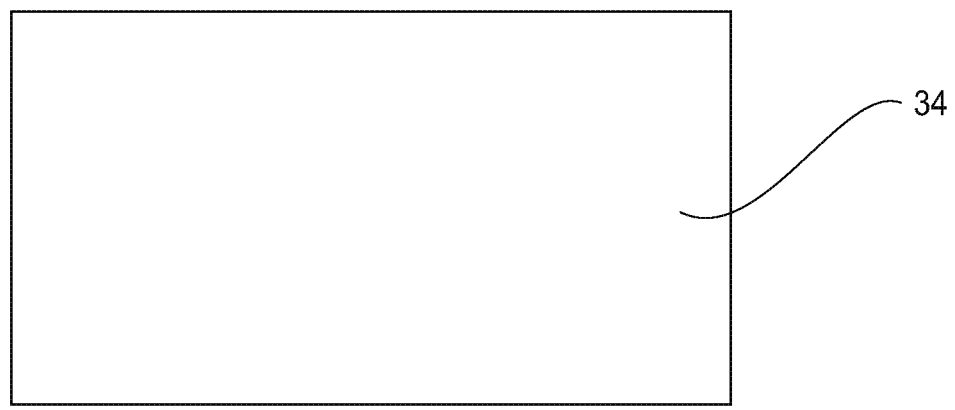
FIG. 7B shows a top view of the bearing pad of FIG. 7A.
Figure 7C:
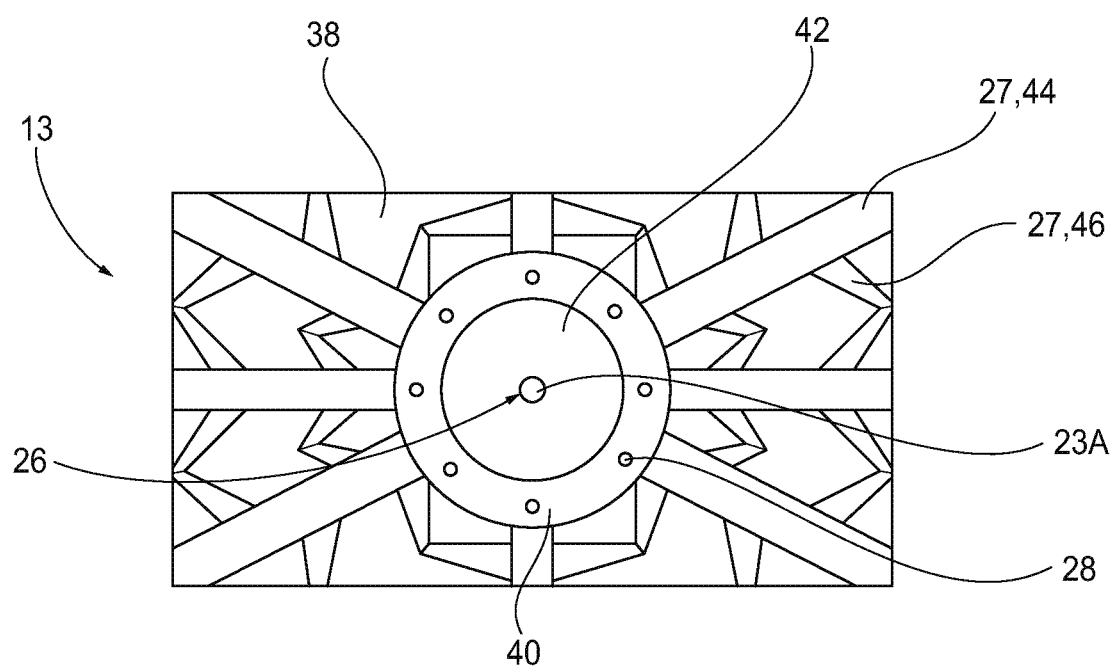
FIG. 7C shows a bottom view of the bearing pad of FIG. 7A.

Referring to FIGS. 7A-7C, in another non-limiting embodiment of the bearing pad 13, the bearing pad 13 is not arcuate-shaped, but has a shape similar to a truss bridge. The direction of rotation of the turbomachinery in FIG. 7A is counter-clockwise. The bearing pad 13 can include a Babbitt thickness 34 connected to a deck plate 38. In one embodiment the deck plate 38 can be arcuate-shaped (e.g., journal bearings), but, in another embodiment, the deck plate 38 can be planar (flat) (e.g., thrust bearings). The deck plate 38 can be a thin layer of backing. The deck plate 38 can be a solid plate or can have holes to allow cooling oil to flow therethrough. The Babbitt thickness 34 can also be solid or can have holes to allow cooling oil to flow therethrough. The Babbitt thickness 34 and the deck plate 38 can have a leading edge 18 and a trailing edge 19.

With continued reference to FIGS. 7A-7C, a central support column 40 can be connected to the deck plate 38. In some embodiments, such as the embodiment in FIG. 7A, the central support column 40 is located on the outer radial side of the deck plate 38 (i.e, the side of the deck plate 38 more remote from the rotating member of the turbomachinery) near the center of the deck plate 38. The central support column 40 can be made of any material of sufficient strength to withstand the forces exerted on the central support column 40. In some instances, the central support column 40 is a solid element. In other examples, such as in FIG. 7A, the central support column 40 defines an internal channel network 26, configured to allow oil to flow therethrough. The internal channel network 26 can include a channel node 25 and at least one passageway 27, such as a plurality of passageways 27. At least one passageway 27 can go to an edge of the bearing pad 13, such as the edge of the central support column 40. An internal cooling opening 23A can be defined in the central support column 40, the internal cooling opening 23A in fluid communication with the internal channel network 26. The central support column 40 can also define at least one cooling discharge opening 28 in fluid communication with the internal channel network 26. The oil discharge openings 28 can be located about the central support column 40, as shown in FIG. 7C. In one embodiment, cooling oil can enter the central support column 40 of the bearing pad 13 through the internal cooling opening 23A and flow into the channel node 25 of the internal channel network 26. The cooling oil can flow into the passageways 27. The cooling oil can exit the central support column 40 by flowing through the passageways 27 and exiting one of the cooling discharge openings 28.

The central support column 40 can define a spherical seat 42. The spherical seat can be defined in a side of the central support column 40 opposite a side of the central support column attached to the deck plate 38. The spherical seat 42 can be configured so as to allow the bearing pad 13 to be attached to a base (not shown). The spherical seat 42 can also be configured to act as a pivot point so that the bearing pad 13 can pivot back and forth. In other words, the bearing pad 13 can pivot about the base connected to the bearing pad 13 in the spherical seat 42 of the central support column 40. In some embodiments, the internal cooling opening 23A of the central support column 40 is defined in the spherical seat 42 (see FIG. 7C).

The bearing pad 13 can include primary support struts 44. The primary support struts 44 can mechanically strengthen the bearing pad 13. The primary support struts 44 can connect the central support column 40 to the deck plate 38 to mechanically strengthen the bearing pad 13. The bearing pad 13 can also further include secondary support struts 46. The secondary support struts 46 can connect the primary support struts 44 to the central support column 40, to other primary support struts 44, to other secondary support struts 46, or to the deck plate 38. The secondary support struts 46 can further mechanically strengthen the bearing pad 13. The network of primary support struts 44 and secondary support struts 46 can provide more surface area over which cooling oil can flow, in order to aid in cooling the bearing pad 13 while still mechanically strengthening the bearing pad 13. Cooling fins (not shown) can be included on the primary support struts 44 and secondary support struts 46 to further aid in cooling the bearing pad 13. Thus, cooling oil that does not flow into the bearing pad 13 (but flows over the bearing pad 13 instead) can help cool the bearing pad having more available surface area over which the cooling oil can flow.

In some non-limiting embodiments, the primary support struts 44 or the secondary support struts 46 can be hollow. These hollow primary support struts 44 or secondary support struts 46 can still be configured to mechanically strengthen the bearing pad 13. The primary support struts 44 or the secondary support struts 46 can be in fluid communication with one another or in fluid communication with the central support column 40, and, in particular, with the internal channel network 26 defined in the central support column 40. Thus, the hollow primary support struts 44 and secondary support struts 46 can be passageways 27 of the internal channel network 26. In addition, the primary support struts 44 or the secondary support struts 44 can include at least one internal cooling opening 23A to allow cooling oil into the primary support struts 42 or the secondary support struts 46. For instance, an internal cooling opening 23A could be defined in a primary support structure 44 near the central support column 40. The primary support struts 44 and the secondary support struts 46 can include at least one cooling discharge opening 28. Cooling discharge openings 28 can also be included in the Babbitt thickness 34 and the deck plate 38, these cooling discharge openings 28 in fluid communication with the primary support struts 44, the secondary support struts 46, or the passageways 27 defined in the central support column 40, so that cooling oil can exit the bearing pad 13.

As one example, cooling oil can enter the bearing pad 13, like the bearing pad 13 shown in FIGS. 7A-7C, through the internal cooling opening 23A and into the channel node 25 of the internal channel network 26 defined in the central support column 40. The cooling oil can flow through the passageways 27 defined in the central support column 40 and exit the cooling discharge openings 28 defined in the central support column 40. The cooling oil can also flow from the passageways 27 defined in the central support column 40 into the passageways 27 defined in the primary support struts 44 or the secondary support struts 46. The bearing pad 13 shown in FIG. 7A-7C can be printed or machined.

Figure 8A:
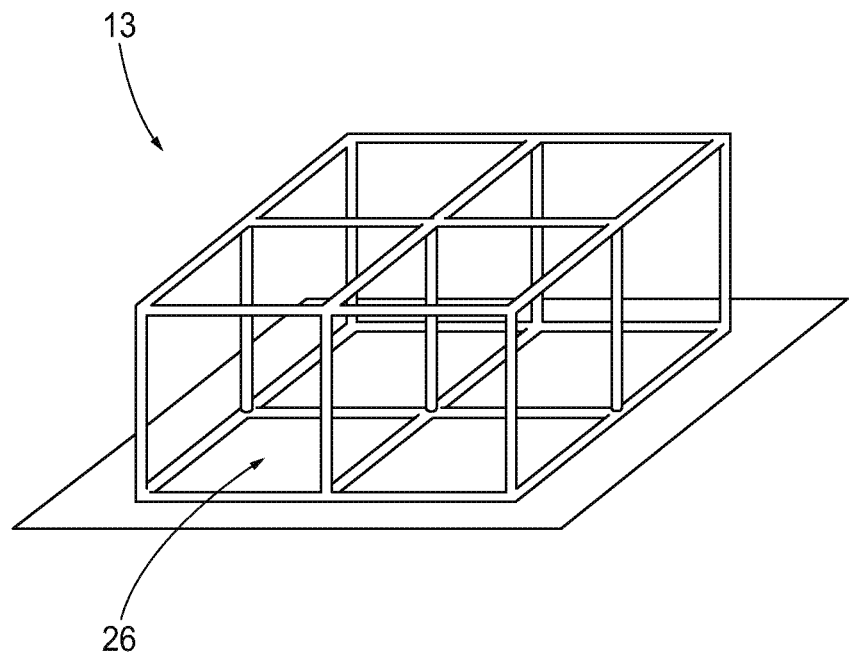
FIG. 8A shows a perspective view of a cubic pattern structure for use in a bearing pad according to one embodiment of the invention.
Figure 8B:
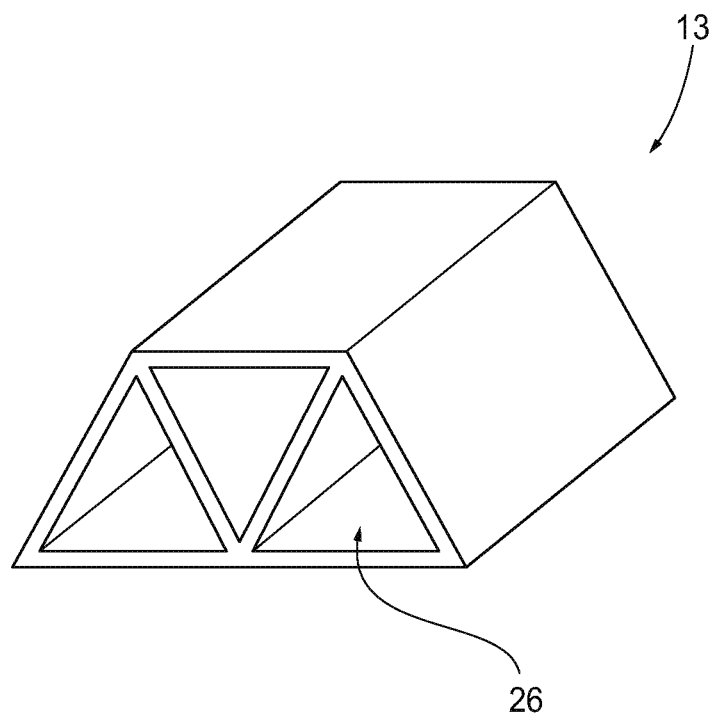
FIG. 8B shows a perspective view of a corrugated pattern structure for use in a bearing pad according to one embodiment of the invention.
Figure 8C:
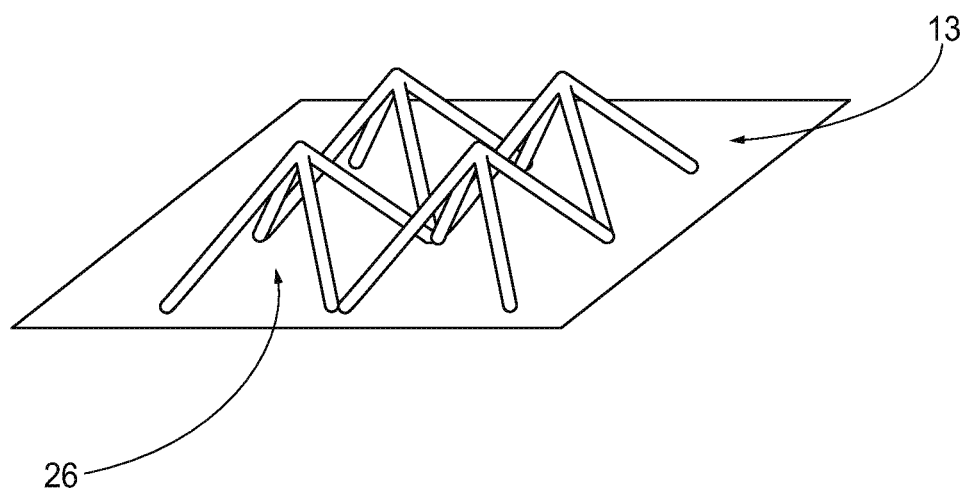
FIG. 8C shows a perspective view of a pyramidal pattern structure for use in a bearing pad according to one embodiment of the invention.

Referring to FIGS. 8A-8C, a portion of or the entire bearing pad 13 can be made using 3D printing. The bearing pad 13 can be 3D printed based on any conceivable structure, including both simple and complex designs. The different structures used in a 3D printed bearing pad 13 can be optimized to more efficiently cool the bearing pad 13 and make a bearing pad 13 of sufficient, or even enhanced, mechanical strength. FIGS. 8A-8C illustrate three non-limiting structures used in 3D printing bearing pads 13. In FIG. 8A, the structure 3D printed for use in the bearing pad 13 is in a cubic pattern. In FIG. 8B, the structure 3D printed for use in the bearing pad 13 is in a corrugated pattern. In FIG. 8C, the structure 3D printed for use in the bearing pad 13 is in a pyramidal pattern. Other possible, non-limiting structures include a hexagonal structure, a square structure, a triangular structure, a diamond structure, a navtruss structure, a tetrahedral structure, a diamond textile structure, a diamond collinear structure, a square collinear structure, a three-dimensional kagome structure, a square honeycomb structure, a triangular honeycomb structure, and a corrugated honeycomb structure (see Wadley, "Multifunctional Periodic Cellular Metals", Phil Trans. R. Soc. A (2006) 364, 31-68, available at http://rsta.royalsocietypublishing.org/content/364/1838/31 (last visited Apr. 15, 2016), which is incorporated herein by reference in its entirety). The structures in FIGS. 8A-8C, and any other conceivable structures can be used to 3D print the entire bearing pad 13, or only a printed portion 36 of the bearing pad 13 (as in FIG. 6). The bearing pad 13 shown in FIGS. 8A-8C can include an internal channel network 26, through which oil flows to cool the bearing pad 13. It is contemplated that in some embodiments, the bearing pad 13 includes no surface covering, like in FIG. 8A; however, the bearing pad 13 can include a surface covering so that the structure is beneath the surface covering of the bearing pad 13 and hidden from view.

While various embodiments of the disclosed internal cooling bearing pads were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A fluid bearing for use in turbomachinery comprising:
at least one bearing pad configured to be arranged about a rotating member of the turbomachinery, each bearing pad comprising:
an internal cooling opening defined in the bearing pad; and
an internal channel network defined in the bearing pad comprising at least one channel node in fluid communication with the internal cooling opening and at least two passageways in fluid communication with and extending from the channel node through the bearing pad,
wherein at least one of the passageways extends to an exterior surface of the bearing pad to define at least one cooling discharge opening, and
wherein channel support structures are located within the internal channel network.

2. The fluid bearing of claim 1, wherein the bearing pad is defined by an inner radial side and an outer radial side, a first axial side and a second axial side, and a circumferential leading edge and a circumferential trailing edge.

3. The fluid bearing of claim 2, wherein the internal cooling opening is defined in the outer radial side of the bearing pad proximate the trailing edge of the bearing pad.

4. The fluid bearing of claim 2, wherein the internal cooling opening is defined in the outer radial side of the bearing pad proximate the leading edge of the bearing pad.

5. The fluid bearing of claim 2, wherein the internal cooling opening is defined in a jacking oil port defined in the outer radial side of the bearing pad.

6. The fluid bearing of claim 2, wherein at least one cooling discharge opening is defined in the first axial side or the second axial side.

7. The fluid bearing of claim 2, wherein at least one cooling discharge opening is defined in the leading edge or the trailing edge.

8. The fluid bearing of claim 2, wherein the bearing pad is arcuate-shaped.

9. The fluid bearing of claim 1, further comprising:
a deck plate;
a central support column connected to an outer radial side of the deck plate, wherein the central support column defines a spherical seat, wherein the internal cooling opening is defined in the spherical seat of the central support column, wherein the central support column defines the internal channel network; and
a plurality of primary support structures connecting the central support column with the deck plate.

10. The fluid bearing of claim 9, further comprising a plurality of secondary support structures, each secondary support structure connecting the primary support structure to the deck plate, another of the secondary support structures, or the central support column.

11. The fluid bearing of claim 10, wherein the primary support structures or the secondary support structures are hollow, and wherein the primary support structures or the secondary support structures are in fluid communication with the internal channel network defined in the central support column such that cooling oil can flow through the primary support structures or the secondary support structures.

12. The fluid bearing of claim 1, wherein the channel support structures are bars or trusses.

13. The fluid bearing of claim 1, wherein the channel support structures mechanically strengthen the bearing pad.

14. The fluid bearing of claim 1, wherein at least a portion of the bearing pad is 3D printed.

15. The fluid bearing of claim 14, wherein the portion of the bearing pad that is 3D printed is proximate a trailing edge of the bearing pad.

16. The fluid bearing of claim 14, wherein the portion of the bearing pad that is 3D printed is proximate a leading edge of the bearing pad.

17. The fluid bearing of claim 14, wherein the portion of the bearing pad that is 3D printed is printed in a cubic pattern, a corrugated pattern, or a pyramidal pattern.

18. The fluid bearing of claim 14, wherein the portion of the bearing pad that is 3D printed is printed in a hexagonal structure pattern, a square structure pattern, a triangular structure pattern, a diamond structure pattern, a navtruss structure pattern, a tetrahedral structure pattern, a diamond textile structure pattern, a diamond collinear structure pattern, a square collinear structure pattern, a three-dimensional kagome structure pattern, a square honeycomb structure pattern, a triangular honeycomb structure pattern, or a corrugated honeycomb structure pattern.

19. The fluid bearing of claim 1, wherein the entire bearing pad is 3D printed.

20. A bearing pad comprising:
an internal cooling opening defined in the bearing pad; and
an internal channel network defined in the bearing pad comprising at least one channel node in fluid communication with the internal cooling opening and at least two passageways in fluid communication with and extending from the channel node through the bearing pad,
wherein at least one of the passageways extends to an exterior surface of the bearing pad to define at least one cooling discharge opening, and
wherein channel support structures are located within the internal channel network.

21. The bearing pad of claim 20, wherein the bearing pad is defined by an inner radial side and an outer radial side, a first axial side and a second axial side, and a circumferential leading edge and a circumferential trailing edge.

22. A fluid bearing for use in turbomachinery comprising:
at least one bearing pad configured to be arranged about a rotating member of the turbomachinery, each bearing pad comprising:
an internal cooling opening defined in the bearing pad; and
an internal channel network defined in the bearing pad comprising at least one channel node in fluid communication with the internal cooling opening and at least two passageways in fluid communication with and extending from the channel node through the bearing pad,
wherein at least one of the passageways extends to an exterior surface of the bearing pad to define at least one cooling discharge opening;
a deck plate;
a central support column connected to an outer radial side of the deck plate, wherein the central support column defines a spherical seat, wherein the internal cooling opening is defined in the spherical seat of the central support column, wherein the central support column defines the internal channel network; and
a plurality of primary support structures connecting the central support column with the deck plate.

* * * * *